United States Patent [19]
Tarhan

[11] 3,927,153
[45] Dec. 16, 1975

[54] PROCESS FOR DIRECT COOLING OF CORROSIVE INDUSTRIAL CASES

[75] Inventor: Mehmet Orhan Tarhan, Bethlehem, Pa.

[73] Assignee: Bethlehem Steel Corporation, Bethlehem, Pa.

[22] Filed: Aug. 14, 1973

[21] Appl. No.: 388,504

[52] U.S. Cl. .................. 261/128; 55/89; 261/151; 261/DIG. 9; 261/DIG. 11
[51] Int. Cl.² ........................................ B01F 3/04
[58] Field of Search .......... 261/18 B, 18 R, 22, 128, 261/151, DIG. 9, DIG. 11, 62; 55/80, 83, 84, 89, 93, 94, 37, 68, 73; 260/681.5; 208/263

[56] References Cited
UNITED STATES PATENTS

| | | | |
|---|---|---|---|
| 1,182,544 | 5/1916 | Ferguson | 261/62 X |
| 2,278,999 | 4/1972 | Kuhl | 55/89 X |
| 2,598,116 | 5/1952 | DuBois | 55/94 X |
| 2,810,450 | 10/1957 | Hartmann | 55/94 X |
| 2,838,135 | 6/1958 | Pilo et al. | 261/151 X |
| 3,204,629 | 9/1965 | Newton, Jr. | 261/DIG. 9 |
| 3,433,840 | 3/1969 | Shima et al. | 55/94 X |
| 3,439,724 | 4/1969 | Mason | 261/DIG. 9 |
| 3,532,595 | 10/1970 | Arnesjo et al. | 55/80 X |
| 3,581,472 | 6/1971 | Grosick | 55/94 X |
| 3,696,162 | 10/1972 | Kniel | 260/681.5 R X |
| 3,710,546 | 1/1973 | Grunewald et al. | 55/73 X |

Primary Examiner—Tim R. Miles
Assistant Examiner—Richard L. Chiesa
Attorney, Agent, or Firm—Joseph J. O'Keefe; Charles A. Wilkinson; Michael J. Gilroy

[57] ABSTRACT

A method of direct cooling of hot corrosive industrial gases, particularly coke oven gas, is achieved by cooling of the gases by direct countercurrent contact with a liquid coolant such that the exit temperature of the coolant is raised to a temperature at which absorption therein of corrosive amounts of acid gases is prevented.

3 Claims, 2 Drawing Figures

PROCESS FOR DIRECT COOLING OF CORROSIVE INDUSTRIAL CASES

BACKGROUND OF THE INVENTION

1. Field of the Invention

This invention relates to direct cooling of hot gases and more particularly to such cooling where the hot gas contains acid gas constituents.

2. Prior Art

The direct cooling of hot gases by spraying or otherwise directly contacting the hot gas with a cooling liquid is known. Most of the prior art applications in which direct cooling is employed are applied, however, to gases which upon cooling will condense and separate therefrom a liquid or solid constituent, because such processes leave the coolant relatively uncontaminated. For example, U.S. Pat. No. 3,433,840 to Shima et al., cools the gaseous products of the catalytic oxidation of propylene with water to cause acrolein to separate. U.S. Pat. No. 2,278,999 to Kuhl uses oil to cool producer gas and thereby cause low boiling products such as gasoline to condense and separate. Other direct cooling processes combine both cooling and absorbing and therefore also include stripping of the coolant. U.S. Pat. No. 3,581,472 to Grosick cools coke oven gas to condense coal tar, which in turn is used to absorb naphthalene from the cooled gas. Each of the foregoing references is representative of the prior art in the use of direct cooling of hot industrial gases to either condense or absorb a constituent of the hot gas. Application of direct cooling by known prior art processes to corrosive gases, for example, coke oven gas, which contains carbon dioxide, hydrogen cyanide and hydrogen sulfide, might be possible theoretically, but are not known in practice within the temperature interval of from 120° C. down to 40° C. The reasons for avoiding direct cooling relate to the absorption of the hot corrosive gases by the coolant. In order to avoid corrosion in the direct cooling apparatus by such absorption, a high liquid-to-gas ratio must be used to rapidly reduce the gas temperature and to dilute the corrosive constituent by the liquid. The spent coolant must, in addition, be stripped to prevent its saturation with such acid gases. The stripping of such large volumes of liquid to a very low residue of dissolved acid gas is very difficult and thus, costly. An alternative to stripping the coolant, e.g., discarding the spent coolant as acid water, is not possible because this large amount of dilute acid water would cause environmental water pollution.

Direct cooling of hot industrial gases which contain acid gases is, therefore, not a conventional practice. In applications such as absorption-desorption processes conventional practice has been to process the hot gases directly in the absorption unit with no prior cooling resulting, in effect, in the bottom portion of the absorber being utilized as a cooler. This method has led to an excessively high rate of corrosion of the absorbing unit. In cases where the corrosion rate is prohibitively high and cooling is necessary, such cooling has been limited to more costly indirect heat exchange processes.

SUMMARY OF THE INVENTION

I have discovered a simple process for direct cooling of hot industrial gases which overcomes the aforementioned prior art disadvantages. The process of this invention is particularly applicable where the industrial gas contains acid gas constituents such as hydrogen sulfide, hydrogen cyanide, and carbon dioxide.

Briefly, in the process of this invention the hot industrial gas is cooled by sensible heat exchange in counter current direct contact with a coolant without absorption by the coolant of acid gases. In order to prevent the absorption of acid gases, the coolant is provided in a predetermined restricted ratio to the gas, as will be explained more fully hereinafter, such that after cooling, the exit gas is cooled to a sufficiently low temperature to accommodate subsequent separation processes or other processes requiring a cool gas and, more importantly, the coolant exit temperature is raised to a sufficiently high temperature to exclude absorption by the coolant of acid gas components which could cause corrosion of the cooling apparatus.

In the practice of the process of this invention the coolant, after cooling, exits from the cooling zone as a non-absorbing but hot spent coolant heated to a sufficiently high temperature such that acid gases are not absorbed and, thus, are substantially absent from the spent coolant. The coolant may then be re-cooled by, for example, indirect heat exchange, and reused without stripping.

In this invention, the critical ratio of coolant to hot gas to achieve a heated spent coolant is accomplished by careful control of the initial hot gas temperature, the composition of the acid gases, the equilibrium vapor pressures of the acid gases in the temperature interval, and the heat capacities of solution and gas, as will be more fully explained hereinafter.

It is therefore an object of this invention to cool acid-gas containing industrial gases efficiently in sensible heat exchange by the use of direct cooling.

It is another object to provide a direct cooling of such gases with no absorption by the coolant of corrosive amounts of acid gases from the gas phase.

It is still another object of this invention to provide a process whereby the coolant may be recycled without intermediate stripping of acid gas contaminants.

These and other objects will be more fully understood by a consideration of the exemplary embodiments and accompanying drawings in which a first general description of the invention will be given followed by a detailed description of the use of the process of this invention in the cooling of coke oven gas.

DESCRIPTION OF THE PREFERRED EMBODIMENTS

In the practice of my invention a heated gas at, for example, about 130° C. and containing, for example, from about 0.02 to about 0.4% by volume of hydrogen cyanide, from about 0.1 to about 2.0% by volume of hydrogen sulfide and from 1.0 to about 3.0% by volume carbon dioxide enters a gas cooling unit near the bottom and travels upward through the unit. A coolant, such as water, at a temperature, for example, from 0° C. to about 45° C. enters the gas cooling unit near the top and travels through the unit in a downward direction so that gas and liquid pass by and through each other in countercurrent fashion. The exit gas is thereby cooled to within the range of about 20° to 50° C. and preferably 30° to 40° C. while the coolant liquid (if water) exits from the unit at near 100° C. At 100° C. the absorption of hydrogen cyanide, carbon dioxide and hydrogen sulfide in water is negligible. The spent heated coolant may then be cooled by indirect heat exchange and reused. The exit gas meanwhile has been cooled to within the range necessary for further processing such as an acid gas absorption/desorption process.

Figure 1:
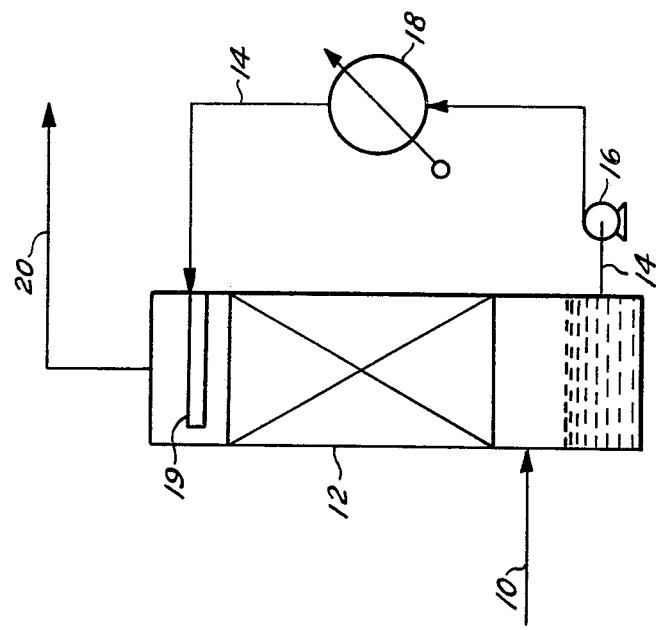
FIG. 1 is a schematic view illustrating an embodiment of this invention showing a direct countercurrent cooling unit.

For a more detailed description and referring now to FIG. 1, an industrial gas enters cooling unit 12 by line 10. Cooling unit 12 may be of the packed column type, or other similar cooler which operates in a countercurrent manner. The coolant enters cooling unit 12 in circulating fashion from the bottom of the same unit by traveling in line 14 through pump 16 and cooler 18 to liquid distributors 19. Cooled gas leaves cooling unit 12 at the top of the unit via line 20.

The operation of the process of this invention has the highest potential benefit when operated in connection with other units such as an absorption/desorption unit for acid gas removal. An embodiment in which coke-oven gas is cooled by the instant invention in combination with acid gas removal is illustrated in FIG. 2.

Figure 2:
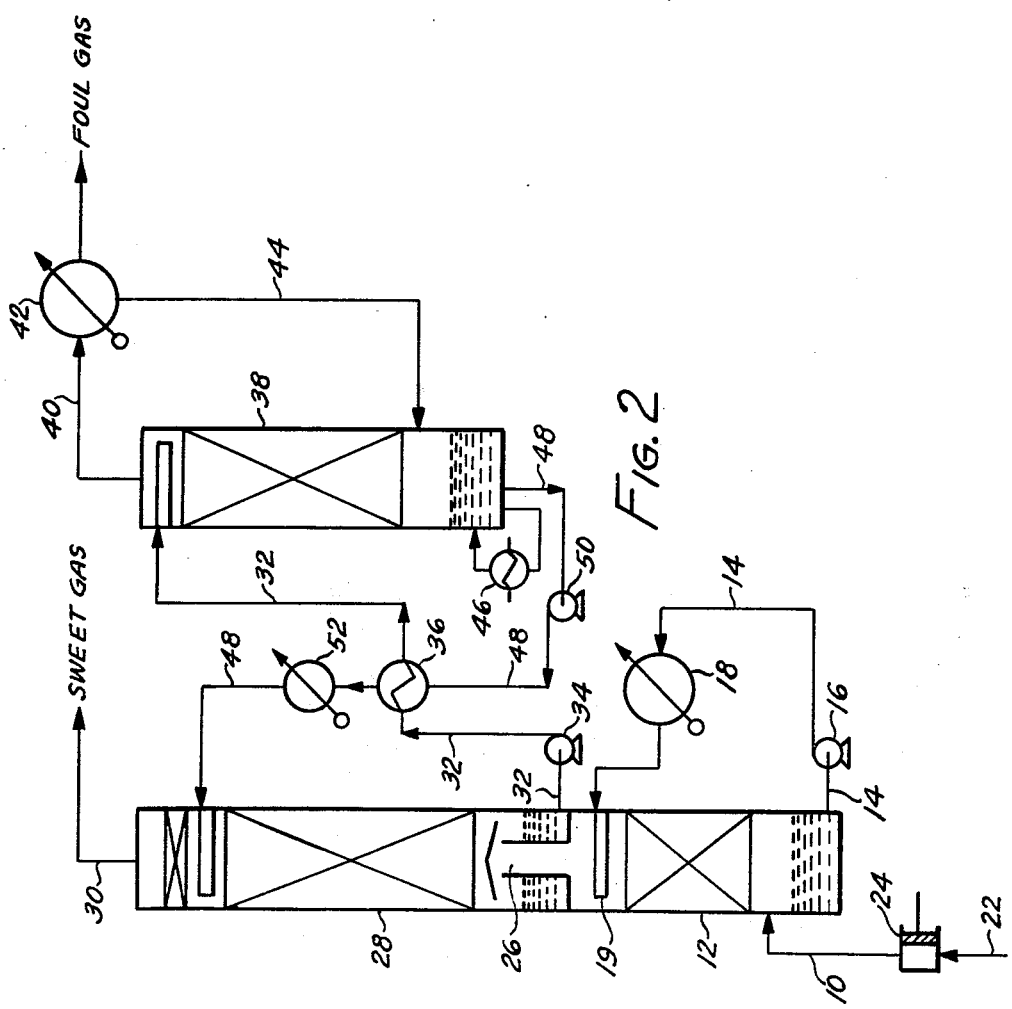
FIG. 2 is a schematic view showing an embodiment of this invention in combination with an acid gas absorbing unit.

Referring to FIG. 2, coke-oven gas, in excess of 100,000,000 ft³/day (2,640,000 cubic meters/day) and of approximate analysis:

| | | |
|---|---|---|
| $H_2$ | 55.0 | vol. % |
| $CH_4$ | 27.6 | " |
| $N_2$ | 4.2 | " |
| CO | 7.4 | " |
| $CO_2$ | 2.3 | " |
| $C_2H_4$ | 1.4 | " |
| $C_2H_6$ | 0.8 | " |
| $C_3H_6$ | 0.3 | " |
| $C_3H_8$ | 0.1 | " |
| Benzene | 0.4 | " |
| HCN | 0.05 | " |
| $H_2S$ | 0.95 | " | and from which tar, ammonia and naphthalene have previously been removed by any suitable process (not shown) enters compressor 24 by way of line 22 where the gas is compressed to a pressure of about 1.7 atmosphere gauges, and as a result becomes heated to about 120° C. The primary purpose of compressor 24 is to boost the gas pressure to assure its flow over a long distance, a common requirement in, for example, steel mills. The hot, compressed gas enters cooling unit 12, as previously described in FIG. 1 where it encounters descending water entering from distributors 19, also previously described. The cooling water flow rate is 2.84 gal/1000 SCF (standard cubic feet). This necessary flow rate to achieve proper heating of the spent coolant is calculated according to the heat balance equation:

$$L(T_{L2} - T_{L1})C_L = G(T_{G1} - T_{G2})C_G \quad (1)$$

or, for coke oven gas;

$$\frac{L}{G} = \frac{198.8}{100 - T_{L1}} \quad (2)$$

to produce an exit coolant temperature $T_{L2}$ of 100° C. In Equation 1:

$L$ = coolant flow, gallons/hr.
$G$ = gas flow, $10^3$ SCF/hr.
$T_{L1}$ = inlet temperature of coolant, ° C.
$T_{L2}$ = outlet temperature of coolant, ° C.
$T_{G1}$ = inlet temperature of gas ° C.
$T_{G2}$ = outlet temperature of gas ° C.
$C_L$ = specific heat of liquid
$C_G$ = specific heat of gas.

The coolant is recycled through heat exchanger 18 into the cooling unit through distributors 19, as shown and described for FIG. 1.

The exit gas, now at about 40° C. enters absorber 28 through bubble caps 26 which are designed to permit the upward flow of gas but prevent a back flow of liquid. Absorber 28 may be of the vacuum carbonate or alkanolamine type, or others well known in the art for acid gas absorbing. In absorber 28 the acid gases in the coke oven gas are absorbed and the industrial gas emerges from the absorber at line 30 as a sweet gas. Spent absorbent from the bottom of absorber 28 leaves the unit in line 32, is pumped by pump 34 through heat exchanger 36 where it is heated and enters desorber 38 where the acid gases, i.e. $H_2S$, $CO_2$, and HCN are stripped. These stripped gases, called "foul gas" leave the desorber 38 through line 40, pass through cooler 42 and exit the unit for further possible processing (not shown). Condensate from cooler 42 is returned to desorber 38 by line 44 where it is combined with regenerated absorbent in the bottom of desorber 38. Desorber 38 is operated in conjunction with reboiler 46. The heated, stripped absorbent leaves desorber 38 in line 48, is pumped by pump 50 to cooler 36 and further through cooler 52 and reenters absorber 28.

The amount of coolant which is needed to effect a sufficiently high final coolant temperature to inhibit absorption of acid gas components depends on several factors, but is readily ascertainable by one skilled in the art. For example, a most important factor is the equilibrium concentration of the acid gas in the coolant. In the case of water as a coolant, for example, and wherein the acid gases are hydrogen sulfide, hydrogen cyanide and carbon dioxide the equilibrium concentration can be calculated from known vapor pressure data. The equilibrium vapor pressure of hydrogen sulfide over a hydrogen sulfide solution in water is given in Table 14–21 on page 14–16 of the 4th Edition of Perry's Chemical Engineer's Handbook. Similarly, the equilibrium vapor pressure of carbon dioxide over water is expressed in Table 14–31 and 14–32 also on page 14–16 of the same reference handbook. The equilibrium vapor pressure of hydrogen cyanide can be determined from curves contained in a company brochure titled "Handling CHN in Cylinders", published by E. I. duPont deNemours & Co., undated, p. 5.

From the equilibrium vapor pressure the concentration of $H_2S$, $CO_2$ and HCN in water is easily calculated from Henry's Law. The following example given for $H_2S$, $CO_2$ and HCN in water is illustrative.

The solution of $H_2S$, $CO_2$, and HCN in pure water follow Henry's Law sufficiently closely, so that one can use it for the instant invention without significant error.

Henry's Law is $P_A = X_A H$
where $P_A$ = partial pressure of acid gas component in gas phase
$X_A$ = mol fraction of acid gas component in water, in equilibrium with $P_A$
$H$ = Henry's constant For example, the mol fraction of $H_2S$ in water of 100° C. in equilibrium with coke oven gas of 2.7 atm. abs. containing 0.7% vol. of $H_2S$ is calculated below:

$$P_{H_2S} = (2.7)(0.006) = 0.0162 \text{ atm.}$$

$10^{-4}H = 14.8$
$H = 148,000$ $$X_{H_2S} = \frac{P_{H_2S}}{H} = \frac{0.0162}{148,000} = 0.000,000,1094 = 1.094 \times 10^{-7}$$

which is extremely small.

Table I gives the concentration of acid gases in water at 25 psig. pressure at various temperatures calculated by the aforedescribed method.

TABLE I

| Temp. °C. | Mol % $H_2S$ | Mol % $CO_2$ | Mol % HCN |
|---|---|---|---|
| 40 | 0.000022 | 0.0023 | 0.12 |
| 90 | 0.000011 | 0.00095 | 0.02 |
| 100 | 0.000011 | 0.00083 | 0.012 |

From Table I, it is readily evident that even at a pressure of 25 psig. (which is quite high for coke oven processes, at near 100° C.), the absorption of acid gas by water as a coolant is negligible.

Similarly, other coolants may be employed, such as petroleum oils of the type commonly used also for the absorption or aromatics from coke oven gas. The composition of the coolant may vary so long as its properties include: (a) chemical inertness to the gas components being cooled, (b) stability at the heated temperature, and (c) low solubility for acid gases at the heated temperature. For example, the coolant should not have an alkaline pH as this characteristic would tend to increase the absorption of the acid gases. This absorption of hot acid gases into the solution is the exact condition which is causing problems today in acid gas absorbers and which is the problem solved by the use of the method of this invention when employed prior to an absorption step.

When the instant invention is utilized with an absorption-desorption process the acid gas absorber should be operated below 50° C., preferably below 40° C. Examples of such processes are the vacuum carbonate process and the monoethanolamine process. However, the application of my invention with acid gas absorbers is not limited to only these two gas purification processes. Any gas purification process which operates its absorption step below 50° C. is contemplated within the scope of this invention.

Furthermore, the gas purification process does not have to comprise an absorption step followed by a stripping or desorption step. Even liquid-phase oxidation processes which consist of an absorption step and a liquid-phase oxidation step may utilize the method of this invention.

There are many advantages which can be realized by the use of my process. A primary benefit derives from the fact that the acid gases are no longer hot when they enter the absorbing units. It is the temperature of these gases which is the prime cause of corrosion of such units. Thus, utilization of acid gas cooling by my invention appreciably reduces corrosion and prolongs equipment life. Further, since the cooling cycle which produces the cooled gas is itself nonabsorptive because of the temperature to which it is heated, corrosion of the cooling system is minimized. No novel equipment design is necessary for the practice of my method. It is simply necessary to restrict the coolant-to-gas ratio such that the coolant exits the unit at a temperature at which acid gas absorption is limited to a non-corrosive level or amount.

In comparison to cooling hot gases by indirect methods, my direct method of cooling offers greater economy. Further, even though my process utilizes indirect cooling for the spent coolant, such cooling is a liquid to liquid type of cooling. It is well known, that heat-transfer coefficients across tubes from gases to liquids are considerably lower than heat-transfer coefficients across tubes from liquids to liquids. Indirect gas coolers require large cooling surfaces and are expensive to build. In my invention the actual gas-coolant contact is, by contrast, direct and efficient and similarly, the indirect heat transfer between coolant and cooling water in cooler 18 is also efficient.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description.

I claim:

1. A method of cooling, in a cooling unit, a hot industrial gas having an acid gas component and an initial temperature of not less than about 100° C comprising:
    a. providing a liquid coolant chemically inert to said acid gas component,
    b. passing said gas at said initial temperature and at a controlled flow rate upwardly through said cooling unit,
    c. introducing said coolant at a first temperature of below about 50° C and at a controlled flow rate into said cooling unit adjacent the upper end thereof,
    d. passing said coolant downwardly through said cooling unit in a manner to cause direct contact between said coolant and said gas,
    e. adjusting the controlled flow rate of said gas and of said coolant in a manner to cool said gas in said chamber from said initial temperature to a final temperature of about 20° to 50° C and to heat said coolant liquid from said first temperature to a second temperature not lower than about 90° C so that absorption of corrosive amounts of the said acid gas component by the liquid coolant is inhibited,
    f. cooling said heated coolant from said second temperature to said first temperature, and
    g. recycling said coolant to said upper end of said cooling unit of step (c).

2. A method according to claim 1 in which the coolant is water.

3. A method according to claim 1 in which the coolant is a petroleum oil.

* * * * *